(12) United States Patent
Mullett

(10) Patent No.: US 12,080,066 B2
(45) Date of Patent: Sep. 3, 2024

(54) ARRANGING A SET OF IMAGES FOR PRESENTATION TO A USER

(71) Applicant: Google LLC, Mountain View, CA (US)

(72) Inventor: Zac James Mullett, Männedorf (CH)

(73) Assignee: Google LLC, Mountain View, CA (US)

( * ) Notice: Subject to any disclaimer, the term of this patent is extended or adjusted under 35 U.S.C. 154(b) by 335 days.

(21) Appl. No.: 17/564,825

(22) Filed: Dec. 29, 2021

(65) Prior Publication Data
US 2023/0206629 A1 Jun. 29, 2023

(51) Int. Cl.
| | |
|---|---|
| *G06V 20/30* | (2022.01) |
| *G06F 3/04855* | (2022.01) |
| *G06V 10/26* | (2022.01) |
| *G06V 10/56* | (2022.01) |
| *G06V 10/74* | (2022.01) |
| *G06V 10/774* | (2022.01) |

(52) U.S. Cl.
CPC .......... *G06V 20/30* (2022.01); *G06F 3/04855* (2013.01); *G06V 10/26* (2022.01); *G06V 10/56* (2022.01); *G06V 10/761* (2022.01); *G06V 10/774* (2022.01)

(58) Field of Classification Search
CPC ........ G06V 20/30; G06V 10/26; G06V 10/56; G06V 10/761; G06V 10/774; G06F 3/04855; G06F 18/22; G06N 20/00; G06N 3/045; G06N 3/08
See application file for complete search history.

(56) References Cited

U.S. PATENT DOCUMENTS

| | | | | |
|---|---|---|---|---|
| 8,090,712 B2* | 1/2012 | Shellshear | ............... | G06F 16/54 707/723 |
| 8,862,987 B2* | 10/2014 | Haussecker | ............. | G06T 17/05 715/244 |
| 2007/0270985 A1* | 11/2007 | Shellshear | ............ | G06F 3/0481 700/226 |
| 2011/0129159 A1* | 6/2011 | Cifarelli | .................. | G06F 16/51 382/284 |

(Continued)

*Primary Examiner* — Aaron W Carter
(74) *Attorney, Agent, or Firm* — Lowenstein Sandler LLP

(57) ABSTRACT

A user request for a set of images is received via a graphical user interface, the subset of images having an initial order. A subset of neighboring images is selected, wherein the subset of neighboring images is ordered according to a first sequence. A first concordance value characterizing visual detectability of one or more illicit content features across images in the subset of neighboring images ordered according to the first sequence is computed. A second concordance value characterizing visual detectability of one or more illicit content features across images in the subset of neighboring images ordered according to a second sequence is computed. Responsive to a difference between the second concordance value and the first concordance value satisfying a predetermined condition, the subset of neighboring images is rearranged according to the second sequence. The previous steps are repeated for a plurality of additional subsets of neighboring images until each image of the set of images has been selected at least once as part of selected subsets of neighboring images to obtain a modified order of the set of images. The graphical user interface is caused to be modified to present the set of images on a grid according to the modified order.

20 Claims, 7 Drawing Sheets

(56) References Cited

U.S. PATENT DOCUMENTS

| | | | |
|---|---|---|---|
| 2011/0184950 A1* | 7/2011 | Skaff | G06F 16/54 |
| | | | 715/810 |
| 2013/0124951 A1* | 5/2013 | Shechtman | G06V 20/41 |
| | | | 715/201 |
| 2023/0206629 A1* | 6/2023 | Mullett | G06V 20/30 |
| | | | 382/159 |

* cited by examiner

Image 302

| Segment 11 | Segment 12 | Segment 13 |
| --- | --- | --- |
| Segment 21 | Segment 22 | Segment 23 |
| Segment 31 | Segment 32 | Segment 33 |

FIG. 3B

ARRANGING A SET OF IMAGES FOR PRESENTATION TO A USER

TECHNICAL FIELD

Embodiments of the present invention relate to the field of image processing, and, more particularly, to arranging a set of images for presentation to a user.

BACKGROUND

A content sharing system can provide a content item (e.g., a video) for display to viewers. Each content item can be provided by a creator and can have a custom image (e.g., a thumbnail image) attached to the content item. The custom images are sometimes designed to attract viewers ("clicks") by misleading users as to the content of the video, e.g., by associating curiosity-inducing custom images with items whose content can be quite different and even of little interest to the viewer. The custom images are sometimes heavily stylized, contain copyrighted content, use protected trademarks, include imagery that is not allowed by the hosting service, or include any other illicit content. Sometimes, the custom images are designed to avoid detection by confusing abuse detection classifiers. Thus, detecting abuse in custom images is often performed by human users, who have to scan large sets of images to detect illicit or misleading content in the custom images.

An aspect of the human visual perception known as figure-ground perception enables humans to excel at pattern matching. When scanning for a particular object in an image, humans can identify the particular object and automatically place everything else in the background. For users scanning through large sets of images, figure-ground perception can be disadvantageous as users are not looking for a specific object but are looking for general themes of illicit content. As users scan through each image, users can begin subconsciously pattern matching and placing images in the background that might contain illicit content. Given the large amount of images to scan, users can also experience fatigue while scanning through each large set. Users can thus fail to accurately scan through each set of images and detect illicit content.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Implementations of the disclosure can include a computer-implemented method to receive, via a graphical user interface, a user request for a set of images, the set of images having an initial order. The method can further (i) select a subset of neighboring images, wherein the subset of neighboring images is ordered according to a first sequence; (ii) compute a first concordance value characterizing visual detectability of one or more illicit content features across images in the subset of neighboring images ordered according to the first sequence; (iii) compute a second concordance value characterizing visual detectability of one or more illicit content features across images in the subset of neighboring images ordered according to a second sequence; (iv) responsive to a difference between the second concordance value and the first concordance value satisfying a predetermined condition, rearranging the subset of neighboring images according to the second sequence. The method can repeat steps (ii) through (iv) for a plurality of additional subsets of neighboring images until each image of the set of images has been selected at least once as part of selected subsets of neighboring images to obtain a modified order of the set of images. The method can cause the graphical user interface to be modified to present the set of images on a grid according to the modified sequence.

In some implementations, computing each concordance value characterizing visual detectability of one or more illicit content features across images in the subset of neighboring images comprises identifying one or more respective colors of a first image and a second image adjacent to the first image in the subset of neighboring images; and determining a distance between a first color of the first image and a second color of the second image, wherein each concordance value corresponds to a respective distance.

In some implementations, computing the first concordance value characterizing visual detectability of one or more illicit content features across images in the subset of neighboring images comprises identifying a first image and a second image adjacent to the first image in the subset of neighboring images ordered according to the first sequence; segmenting the first image and the second image into respective pluralities of segments, wherein each segment comprises a respective color; computing a plurality of distance values, wherein each of the plurality of distance values characterizes a distance between the color of a respective segment of the first image and the color of a corresponding segment of the second image; and determining the first concordance value using the computed plurality of distance values.

In some implementations, the method can further include generating training data for a machine learning model, wherein the training data comprises a training input comprising pixel data of each image of a plurality of training images and generating a target output for the training input, wherein the target output identifies a geometric similarity between each image of the plurality of training images. The method may further train the machine learning model on the training data comprising the training input and the target output.

In some implementations, computing each concordance value characterizing visual detectability of one or more illicit content features across images in the subset of neighboring images comprises identifying a first image and a second image adjacent to the first image in the subset of neighboring images and applying the trained machine learning model to the first image and the second image to obtain an output indicating a geometric similarity between the first image and the second image, wherein each concordance value corresponds to a respective geometric similarity.

In some implementations, the user request for the set of images is received in response to a user interaction with a scroll-bar comprised by the graphical user interface.

In some implementations, each image of the set of images comprises a thumbnail image of a video uploaded to a content sharing system by a user.

In some implementations, rearranging the subset of neighboring images according to the second sequence comprises converting a corresponding position in the first sequence for a neighboring image into a new position in the second sequence.

Implementations of the disclosure can include a computer-implemented method to perform an image-arrangement process comprising selecting, from an ordered set of images, a subset of images in a first arrangement; computing a first similarity score characterizing visual similarity of the subset of images in the first arrangement; identifying a second arrangement for the selected subset of images; computing a second similarity score characterizing visual similarity of the subset of images in the second arrangement; determining, based on the first similarity score and the second similarity score, a probability of acceptance of the second arrangement of the subset of images; probabilistically selecting, based on the determined probability of acceptance, a new arrangement of the subset of images from at least the first arrangement and the second arrangement; and causing to display, via a graphical user interface, the selected new arrangement of the subset of images.

In some implementations, determining the probability of acceptance can be further based on a duration of the image-arrangement process.

In some implementations, the second similarity score is less than the first similarity score, and the probability of acceptance of the second arrangement is a decreasing function of the duration of the image-arrangement process.

In some implementations, the duration of the image-arrangement process is defined based on a number of subsets of images previously selected as rearrangement candidates.

In some implementations, the subset of images comprises a first image and a second image adjacent to the first image.

In some implementations, the first image is selected randomly from at least a portion of the set of images.

In some implementations, the first image is selected deterministically according to a predefined selection pattern.

In some implementations, computing each similarity score characterizing visual similarity of the subset of images comprises identifying one or more respective colors of a first image and a second image adjacent to the first image in the subset of images; and determining a distance between a first color of the first image and a second color of the second image, wherein each similarity score corresponds to a respective distance.

In some implementations, computing the first similarity score characterizing visual similarity of the subset of images comprises identifying a first image and a second image adjacent to the first image in the subset of images; segmenting the first image and the second image into respective pluralities of segments, wherein each segment comprises a respective color; computing a plurality of distance values, wherein each of the plurality of distance values characterizes a distance between the color of a respective segment of the first image and the color of a corresponding segment of the second image; and determining the first similarity score using the computed plurality of distance values.

In some implementations, the method can further comprise generating training data for a machine learning model, wherein the training data comprises a training input comprising pixel data of each image of a plurality of training images and generating a target output for the training input, wherein the target output identifies a geometric similarity between each image of the plurality of training images. The method can further comprise training the machine learning model on the training data comprising the training input and the target output.

In some implementations, computing each similarity score characterizing visual similarity of the subset of images comprises identifying a first image and a second image adjacent to the first image in the subset of images and applying the trained machine learning model to the first image and the second image to obtain an output indicating a geometric similarity between the first image and the second image, wherein each similarity score corresponds to a respective geometric similarity.

In some implementations, each image of the subset of images comprises a thumbnail image of a video uploaded to a content sharing system by a user.

BRIEF DESCRIPTION OF THE FIGURES

The present invention will be understood more fully from the detailed description given below and from the accompanying drawings of various embodiments of the invention.

FIG. 3B illustrates an example segmentation of an image, in accordance with some implementations of the disclosure.

DETAILED DESCRIPTION

Figure 1:
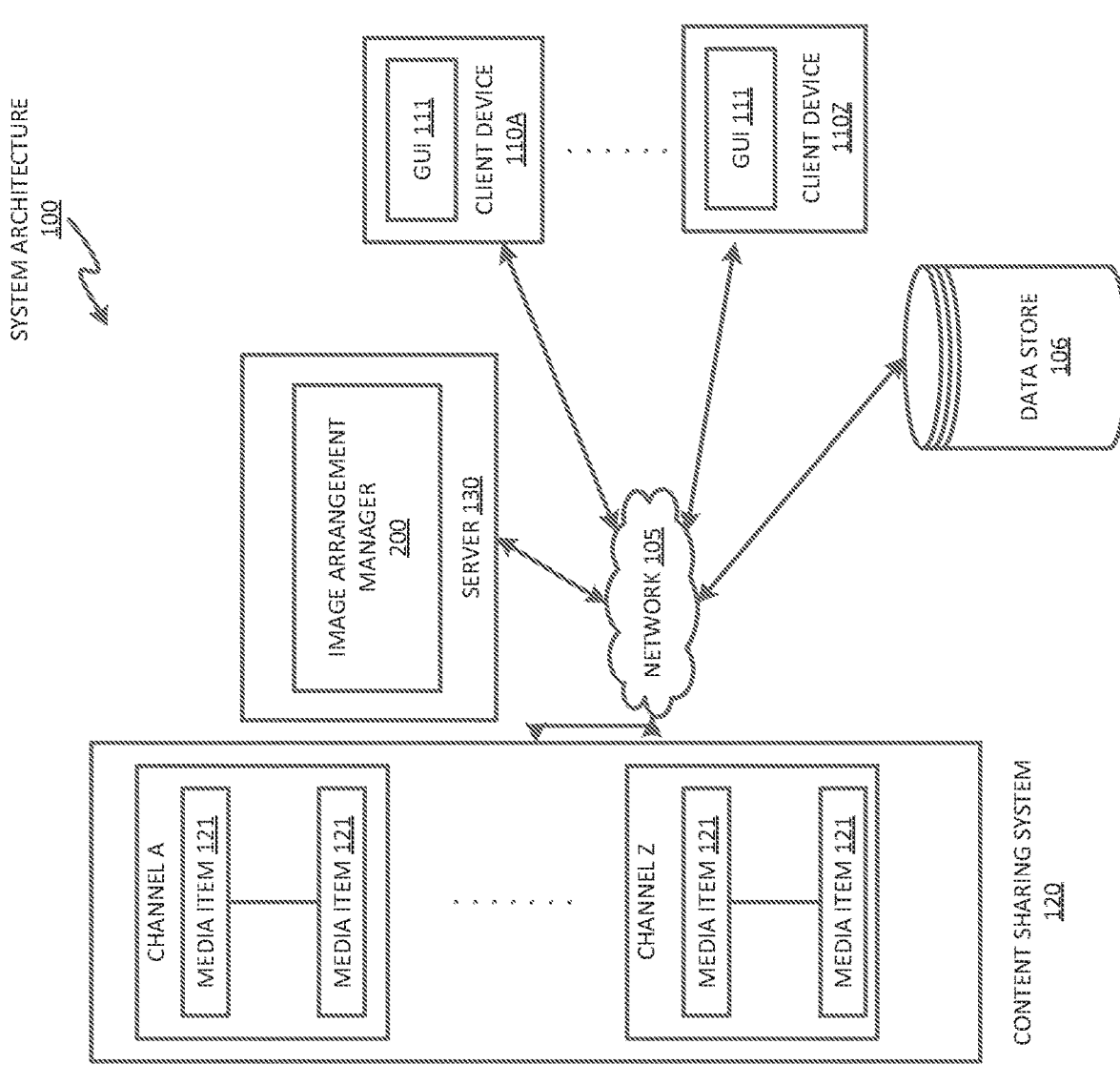
FIG. 1 illustrates an exemplary system architecture, in accordance with some implementations of the disclosure.

Aspects of the present disclosure are directed to arranging a set of images for presentation to users. In general, content sharing systems can provide users with images that the users are tasked with scanning for particular content or themes of content. Such content could include illicit content such as content involving egregious visual material under the content sharing systems' policies, e.g., acts of violence or unlawful behavior, pornographic content, age-inappropriate content, etc. Typically, large sets of images are displayed to users on a single grid of a graphical user interface. Users can thus scan through large sets of images at a time instead of going through each image one at a time. However, each image in a set of images presented to a user is typically randomly ordered. Due to the aspect of human visual perception known as figure-ground perception, users can fail to accurately identify particular content in the set of images. For example, when scanning through each set of image, users can begin subconsciously matching patterns among the images and placing other images in the background that might be relevant (e.g., might contain illicit content). Further, users can experience fatigue due to the large amounts of images to scan through. These issues can require users to repeat scanning, and/or take more time to do the scanning, which results in consumption of a significant amount of computing and storage resources by user devices and the content sharing system. In addition, users that do the scanning can miss images including illicit content, thereby requiring the content sharing system to implement additional measures to comply with its content presentation policies and to avoid subjecting viewers (including, for example, children) to presentation of inappropriate content. The implementation of additional measures leads to consumption of further computing and storage resources.

Aspects of the present disclosure address the above and other deficiencies by arranging a set of images for presentation to users (e.g., illicit content detection experts) in an order that enables users to more easily identify particular content or themes of content in the set of images. In some implementations, when a user requests a set of images (e.g., on a graphical user interface), the set of images may be initially presented in some arbitrary order (e.g., in a random order). The set of images can be a set of thumbnail images of videos uploaded by various entities to a content sharing system. Responsive to the user request, the order of presentation of the set of images can be modified in a way that improves detectability of certain features (e.g., features that are representative of an illicit content). The modification of the order of presentation can be performed via a number of iterations, each iteration changing an order of at least some (e.g., two or more) images. More specifically, a subset of neighboring images of the set of images can be selected. For example, two images can be selected together with their neighboring images (e.g., nearest neighbors on each side, second nearest neighbors on each side, etc.). In another example, a fixed number of rows of images can be selected (e.g., the number of rows that are likely to be within a field of view of a typical viewer). The selected subset can be ordered according to a first (e.g., initial) sequence. For example, image A can precede image B, e.g., image A can be in the same row and to the left of image B or can be in a row that is above the row of image B. For the subset of neighboring images in the initial sequence, a concordance value (e.g., a first concordance value) can be computed. Various possible rearrangements of the subset of neighboring images can then be evaluated. The rearrangements can have one or more images swapped with other images, e.g., with various adjacent (nearest neighbor) images or even with more distant images. For example, image A can be swapped with image B or with any neighbor of image B. New concordance values can be computed for various such candidate rearrangements. The initial concordance value and the new concordance values can reflect the visual detectability of one or more illicit content features across various images of the subset of neighboring images. The concordance values can indicate how likely a user is to detect one or more illicit features in an image (or multiple images) of the subset of images without and with the rearrangement. For example, each concordance value can be computed based on a color distance between two adjacent images in the subset of neighboring images. In another example, each concordance value can be computed by first segmenting each of the two adjacent images into a set of segments and computing the color distance between each segment of the two adjacent images. In another example, a machine learning model can be trained to identify geometric similarities between each image of the set of images. Each concordance value can then be computed based on a geometric similarity between two adjacent images in the subset of neighboring images.

Once the concordance values are computed for the subset of neighboring images in the initial sequence and the various candidate sequences, a difference between the first concordance value and concordance values for some candidate rearrangements (e.g., for the subset of images rearranged in a second sequence) can be computed. If the difference satisfies a predetermined condition (e.g., the images are visually similar), then an arrangement of images according to the candidate sequence can be implemented. For example, the second concordance value characterizing visual detectability of various features in images A and B after the images A and B are swapped can be higher than the first concordance value (for images A and B in their original positions). The process of selecting a set of neighboring images, evaluating the selected set for visual concordance, and determining a rearrangement that improves the concordance can be repeated multiple times. Some of the new (subsequently selected) subsets of neighboring images can have at least some images that are different from the images in the already processed subsets. For example, the first subset of neighboring images can be centered on image A and can include image A and its eight nearest neighbors on all side; the second subset of neighboring images can be centered on the right neighbor of image A and can include the corresponding eight nearest neighbors, and so on. Different selected subsets can partially overlap. In some implementations, the same subsets of images can be selected multiple times. For example, after a certain region (e.g., n adjacent rows) of the set of images has been processed, the optimization process can return to the start of the region and repeat processing of the region one (or more) times. The process can continue until each image in the set of images has been selected at least once as part of a subset of images. The process can conclude with obtaining a modified order of the set of images. The graphical user interface can then be modified to present the set of images on a grid according to the modified order.

In some implementations, the image-arrangement process can be deterministic, e.g., as described above, e.g., with the arrangements having a higher concordance value preferred to arrangements having a lower concordance value. In some embodiments, the image-arrangement process can be fully or partially stochastic (probabilistic). More specifically, a subset of images can be selected from an ordered set of images. The ordered set of images can be a set of thumbnail images of videos uploaded to a content sharing system. The subset of images can be in an initial arrangement. The subset of images can include two (or more) images adjacent to each other. A similarity score (e.g., concordance value) can be computed for the subset of images. Another arrangement for the selected subset of images can then be identified. A similarity score of the subset of images in the other arrangement can be computed. Each similarity score can reflect a visual similarity of the subset of images in each arrangement. For example, the similarity score can be computed based on a color distance between two adjacent images in the subset of images. In another example, the similarity score can be computed by first segmenting each of two adjacent images into a set of segments and computing the color distance between each segment of the two adjacent images. In another example, a machine learning model can be trained to identify geometric similarities between each image of the subset of images. The similarity score can be computed based on a geometric similarity between two adjacent images in the subset of images.

Based on the two similarity scores, a probability of acceptance of the other arrangement for the selected subset of images can be calculated. The probability of acceptance can further be based on the duration of the image-arrangement process. Based on the calculated probability, a new arrangement for the selected subset of images can be probabilistically selected out of the initial arrangement and the other arrangement. Such probabilistic selection allows to (temporarily) exploit local rearrangements that decrease the similarity score and avoid locking into local optima too early in the image-rearrangement process. The selected new arrangement can then be displayed via a graphical user interface or used as an initial arrangement for the next iteration of the image-arrangement process.

Calculating the probability of acceptance and probabilistically selecting arrangements can be done using simulated annealing techniques. Simulated annealing is characterized by iterative improvement of a solution by replacing the solution with a random solution and measuring the progress relative to a target metric (e.g., the similarity and/or concordance value). Random, as used herein, includes pseudo-random, which may not be 100% random, 100% of the time.

Simulated annealing (SA) is a metaheuristic learning process that provides an explicit strategy to avoid a solution that converges on a local, apparently optimum value, rather than the desired global optimum value. The SA learning process, as applied to finding the solution of an optimum arrangement of images, allows successive random moves from one potential candidate image to another, possibly resulting in solutions of worse quality (images with a worse score relative to a metric), thereby escaping from a convergence on a false local optimum value. The ability to jump to a random value that is farther away and/or in a different direction than a previous tested value, especially early on in the solution process, avoids a convergence on a false local optimum value.

The SA learning process allows for a determination of an acceptably good solution in a fixed amount of time, rather than the best possible solution in an infinite amount of time. Each operation of the SA learning process attempts to replace the current solution with a random solution (chosen according to a candidate distribution, often constructed to sample from solutions near the current solution). The new solution may then be accepted with a probability that depends both on the ratio between the score of the currently selected solution and the aggregate scores for all previous solutions, and also on a global parameter, that may be gradually changed during the process. The dependency is such that the choice between the previous and current solution is almost random when the global parameter is less than one, but increasingly selects the better solution as the global parameter increases from one. The allowance for moves that seemingly take the solution farther away from the optimum value when the global parameter is less than one potentially saves the method from becoming stuck at a local minimum rather than approaching the desired global optimum solution. In one non-limiting illustrative implementation, the SA learning process, as applied to selecting an arrangement of images from a first (initial, current) arrangement of images having a first concordance value (or similarity score) $C_1$ and a second (candidate) rearrangement of the same images having a second concordance value (or similarity score) $C_2$, can first determine the probability of replacing the first arrangement with the second arrangement using the following example Equation A:

$$P = \frac{1}{\exp[\beta \cdot (C_1 - C_2)] + 1},$$

where P is the probability of replacement and $\beta$ is the inverse "temperature" of simulated annealing, which can change with the duration of the annealing process. "Temperature" $1/\beta$ can decrease with duration of time; correspondingly parameter $\beta$ can increase with time. In situations where the candidate rearrangement has a lower concordance value, $C_1 > C_2$, the probability of selecting the candidate rearrangement is nonetheless non-zero as long as $C_1 - C_2 \lesssim 1/\beta$ but decreases sharply for $C_1 - C_2 \gtrsim 1/\beta$. Smaller initial values of $\beta$ (larger values of $\beta$) are, therefore, conductive to selecting arrangements that are less than optimal, which allows to explore and evaluate a significantly broader range of arrangements. As the duration of the process increases, the value of $\beta$ can be increased, such that the probability approaches the Heaviside step function, $P \to \Theta(C_2 - C_1)$, that disfavors selection of sub-optimal arrangement.

Thus, aspects of the present disclosure may arrange images for presentation to users into an order that is more easily scanned and interpreted based on the human visual system. By ordering images based on visual similarities between the images, such as color differences, geometric similarities, and/or based on simulated annealing, an optimum order for the images can be found, where the optimum order allows users tasked with detecting illicit content in each image to be able to scan through large sets of images with improved task accuracy while experiencing less visual fatigue. As a result, the duration of scanning is shortened, resulting in consumption of fewer computing and storage resources by user devices and the content sharing system. In addition, higher accuracy of illicit content detection improves compliance with the content sharing systems' policies and eliminates the need to implement additional measures for such compliance, thereby further reducing consumption of computing and storage resources. Furthermore, content sharing systems that rely on users to detect particular content such as illicit content in large sets of images, can experience an improvement in overall efficiency.

FIG. 1 illustrates an example system architecture 100, in accordance with some implementations of the disclosure. The system architecture 100 includes client devices 110A through 110Z, a network 105, a data store 106, a content sharing system 120, and a server 130. In one implementation, network 105 may include a public network (e.g., the Internet), a private network (e.g., a local area network (LAN) or a wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, network connected televisions, netbook computers, etc. In some implementations, client device 110A through 110Z may also be referred to as "user devices." Each client device include a GUI 111. In one implementation, the GUI 111 may be applications that allow users to view content, such as images (e.g., sets of images including thumbnail images), web pages, documents, etc. For example, the GUI 111 may be a web browser than can access, retrieve, present, and/or navigate content (e.g., web pages such as Hyper Text Markup Language (HTML) pages, digital media items or content items, etc.) served by a web server. The GUI 111 may render, display, and/or present the content (e.g., the image) to a user. The GUI 111 may be a standalone application that allows users to view digital media content items (e.g., digital images, videos, electronic books, etc.).

The GUI 111 may be provided to the client devices 110A through 110Z by the server 130 and/or content sharing system 120. For example, the GUI 111 may be embedded media players that are embedded in web pages provided by the content sharing system 120. In another example, the GUI 111 may be applications that communicate with the server 130.

In general, functions described in one implementation as being performed by the content sharing system 120 can also be performed on the client devices 110A through 110Z in other implementations, if appropriate. In addition, the functionality attributed to a particular component can be performed by different or multiple components operating together. The content sharing system 120 can also be accessed as a service provided to other systems or devices through application programming interfaces, and thus is not limited to use in websites.

In one implementation, the content sharing system 120 may be one or more computing devices (such as a rackmount server, a router computer, a server computer, a personal computer, a mainframe computer, a laptop computer, a tablet computer, a network connected television, a desktop computer, etc.), data stores (e.g., hard disks, memories, databases), networks, software components, and/or hardware components that may be used to provide a user with access to media items (also referred to as content items) and/or provide the media items to the user. For example, the content sharing system 120 may provide a set of images to users and task the users with detecting particular content in the set of images, such as illicit content. The content sharing system 120 may also include a website (e.g., a webpage) that may be used to provide a user with access to the media items.

The content sharing system 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner. Each channel may include one or more media items 121 (i.e., content items or video content items). Examples of a media item 121 can include, but are not limited to, digital images, videos, movies, music, website content, etc.

A media item 121 may be consumed via the Internet and/or via a mobile device application. As used herein, "media," "media item," "online media item," "digital media," "digital media item," "content," "content item" and "video content item" can include an electronic file that can be executed or loaded using software, firmware or hardware configured to present the digital media item to an entity. In one implementation, the content sharing system 120 may store the media items 121 using the data store 106.

In one implementation, the server 130 may be one or more computing devices (e.g., a rackmount server, a server computer, etc.). The server 130 may be included in the content sharing system 120 or may be part of a different system. The server 130 may host an image arrangement manager 200 that arranges a set of images for presentation to the client devices 110A to 110Z on the GUI 111. Further details with regard to the image arrangement manager 200 are disclosed in conjunction with FIG. 2.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

Figure 2:
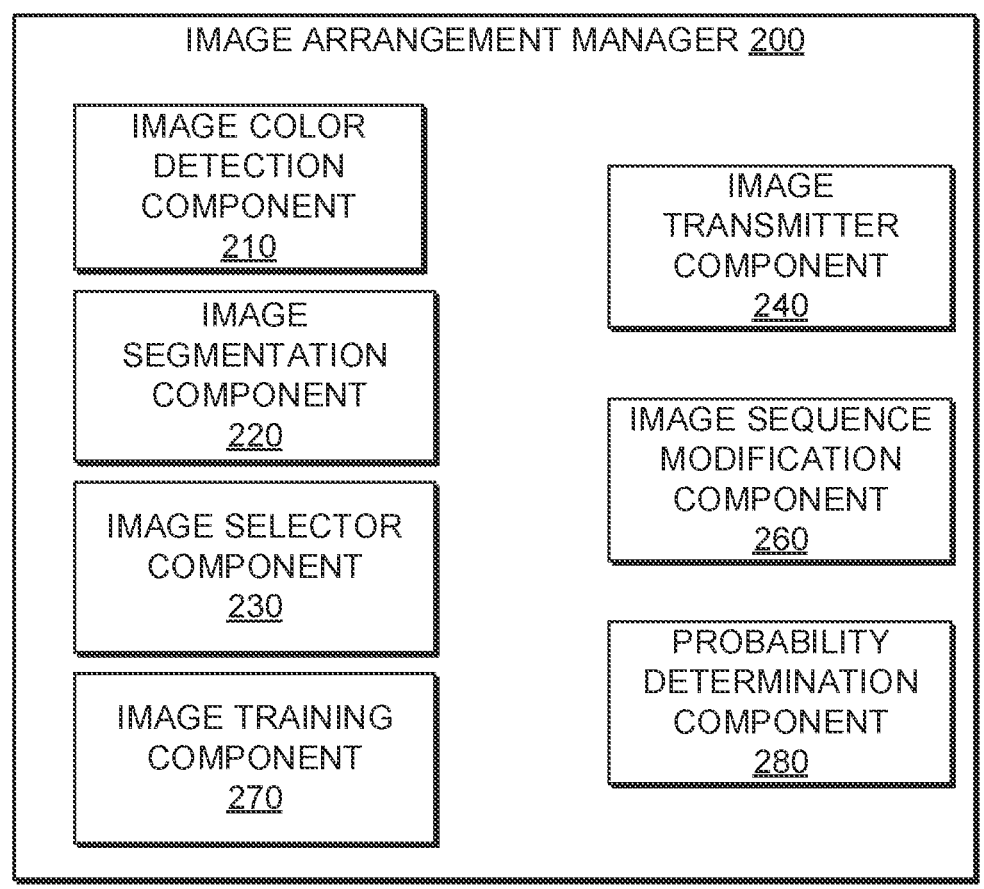
FIG. 2 is a block diagram of an image arrangement manager, in accordance with some implementations of the disclosure.

FIG. 2 illustrates an image arrangement manager 200. In general, the image arrangement manager may correspond to the image arrangement manager 200 of a server system 130 as shown in FIG. 1. The image arrangement manager 200 may include an image color detection component 210, an image segmentation component 220, an image selector component 230, an image training component 270, an image transmitter component 240, an image sequence modification component 260, and a probability determination component 280. In alternative implementations, the functionality of one or more of the components may be combined or divided.

As shown in FIG. 2, the image arrangement manager 200 may include an image selector component 230 which may receive a request from a user for a set of images. For example, the image selector component 230 may receive a request from a user via a graphical user interface. The user may request a set of images including thumbnail images of videos uploaded to a content sharing system (e.g., the content sharing system 120 of FIG. 1). The image selector component 230 may identify a subset of images of the set of images for selection. Further details with regard to the image selector component 230 are described in conjunction with FIGS. 4 and 5.

Referring to FIG. 2, the image arrangement manager 200 may further include an image color detection component 210. The image color detection component 210 may detect color difference between colors of images in a set of images. For example, the image color detection component 210 may detect respective colors of two adjacent images in a set of images. The image color detection component 210 may compute a distance between each color of the two adjacent images. Further details with regard to the image color detection component 210 are described in conjunction with FIGS. 4 and 5.

The image arrangement manager 200 may further include an image segmentation component 220. The image segmentation component 220 may segment each image in a set of images of a set of segments. Each segment can comprise one or more respective colors. Further details with regard to the image segmentation component 220 are described in conjunction with FIGS. 4 and 5.

The image arrangement manager 200 may further include an image training component 270. The image training component 270 may train a machine learning model to identify geometric similarities between images in a set of images. For example, the image training component 270 may utilize the machine learning model to identify geometric similarities between two adjacent images in the set of images.

Figure 4:
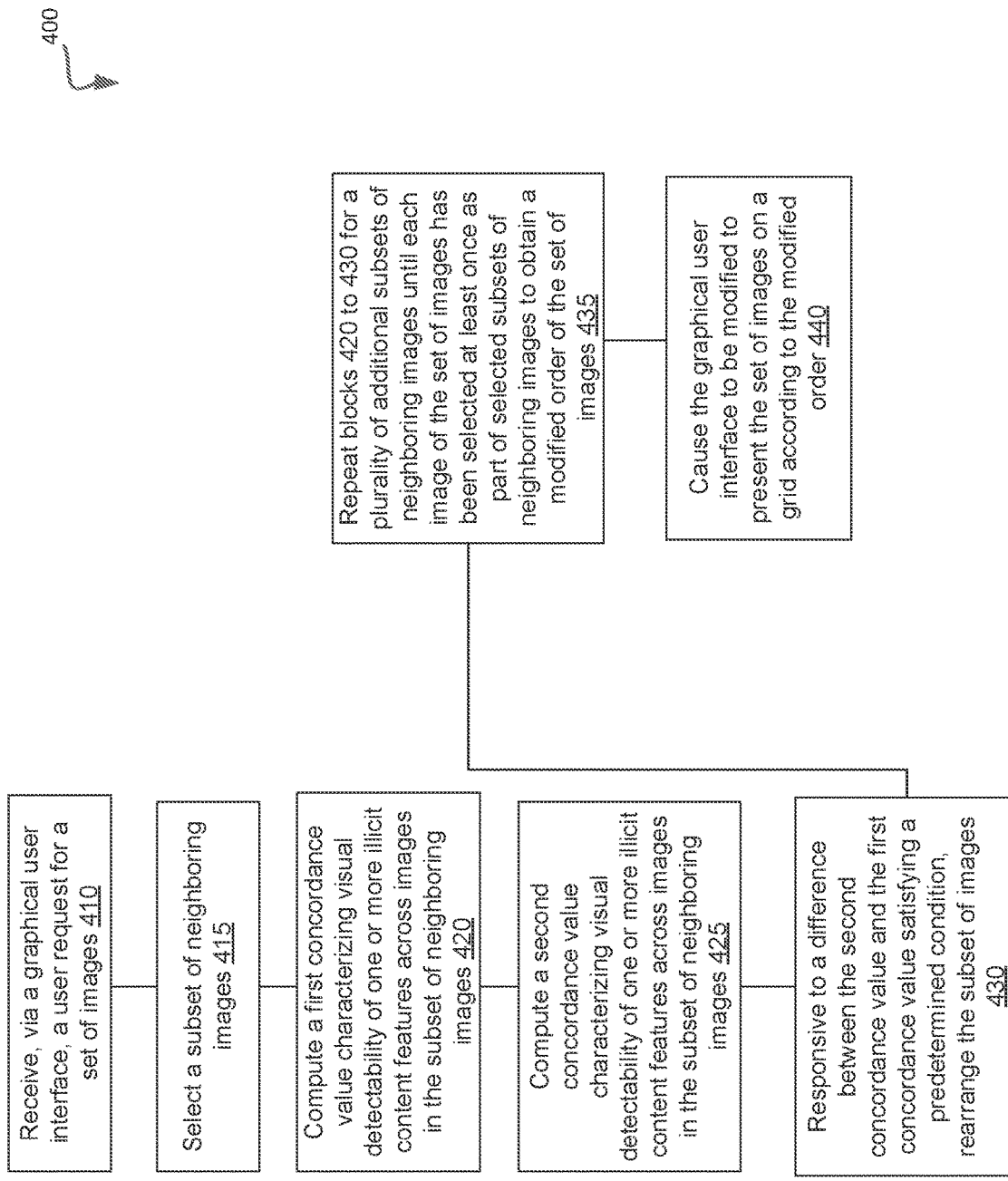
FIG. 4 is a flow diagram of an example method to arrange images for presentation to users, in accordance with some implementations of the disclosure.
Figure 5:
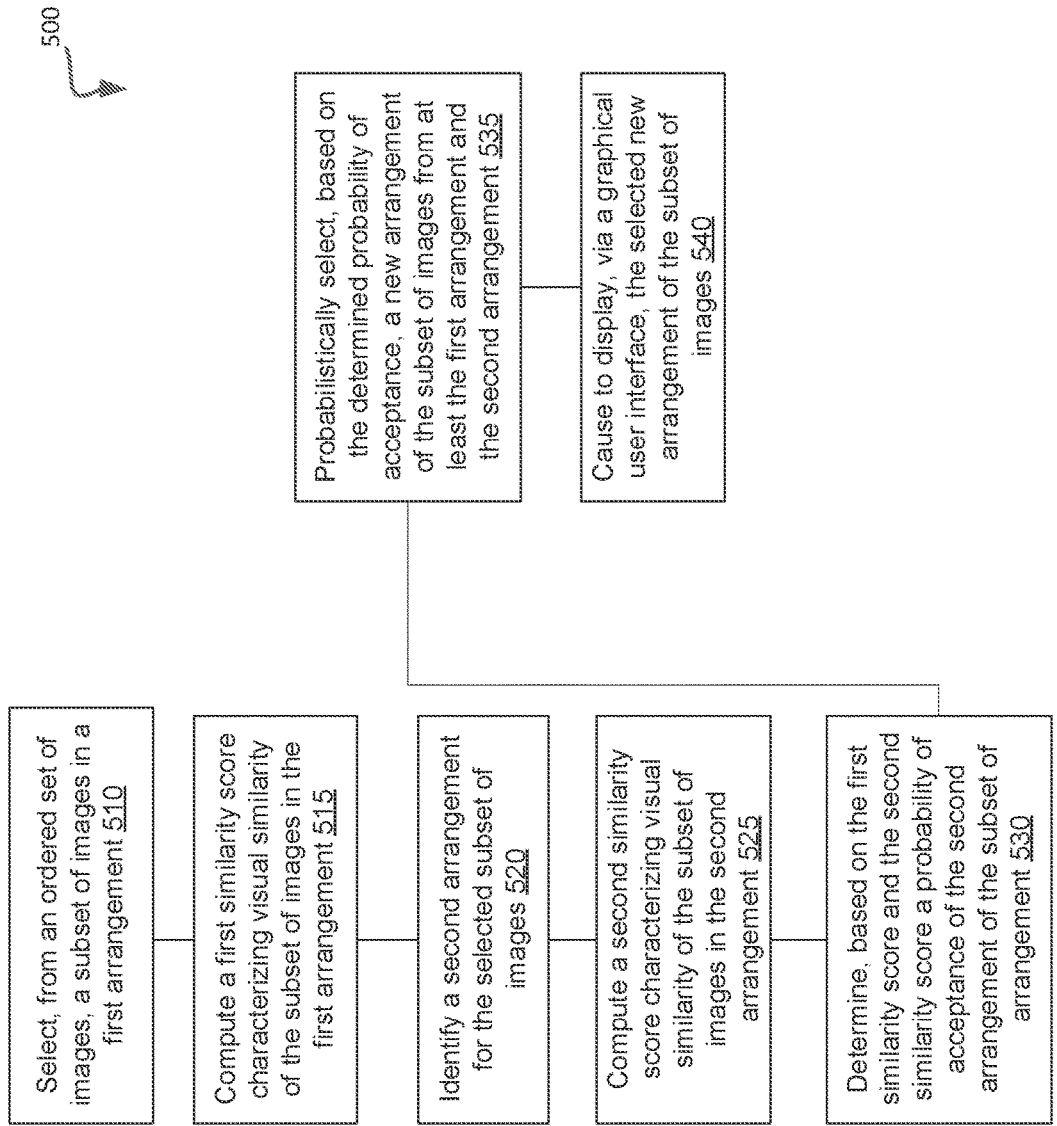
FIG. 5 is a flow diagram of an example method to arrange images for presentation to users, in accordance with some implementations of the disclosure.

Further details with regard to the image training component 270 are described in conjunction with FIGS. 4 and 5.

The image arrangement manager 200 may further include an image sequence modification component 260. In some implementations, the image sequence modification component 260 can modify sequences of images. For example, the image sequence modification component 260 can rearrange the order of images in the set of images. In some implementations, the image sequence modification component 260 can swap images such as neighboring images. Further details with regard to the image modification component 260 are described in conjunction with FIGS. 4 and 5.

The image arrangement manager 200 may further include a probability determination component 280. The probability determination component 280 can use simulated annealing techniques, as described herein above, to determine the probability of accepting a particular arrangement of a set of images. Further details with regard to the probability determination component 280 are described in conjunction with FIGS. 4 and 5.

Figure 3A:
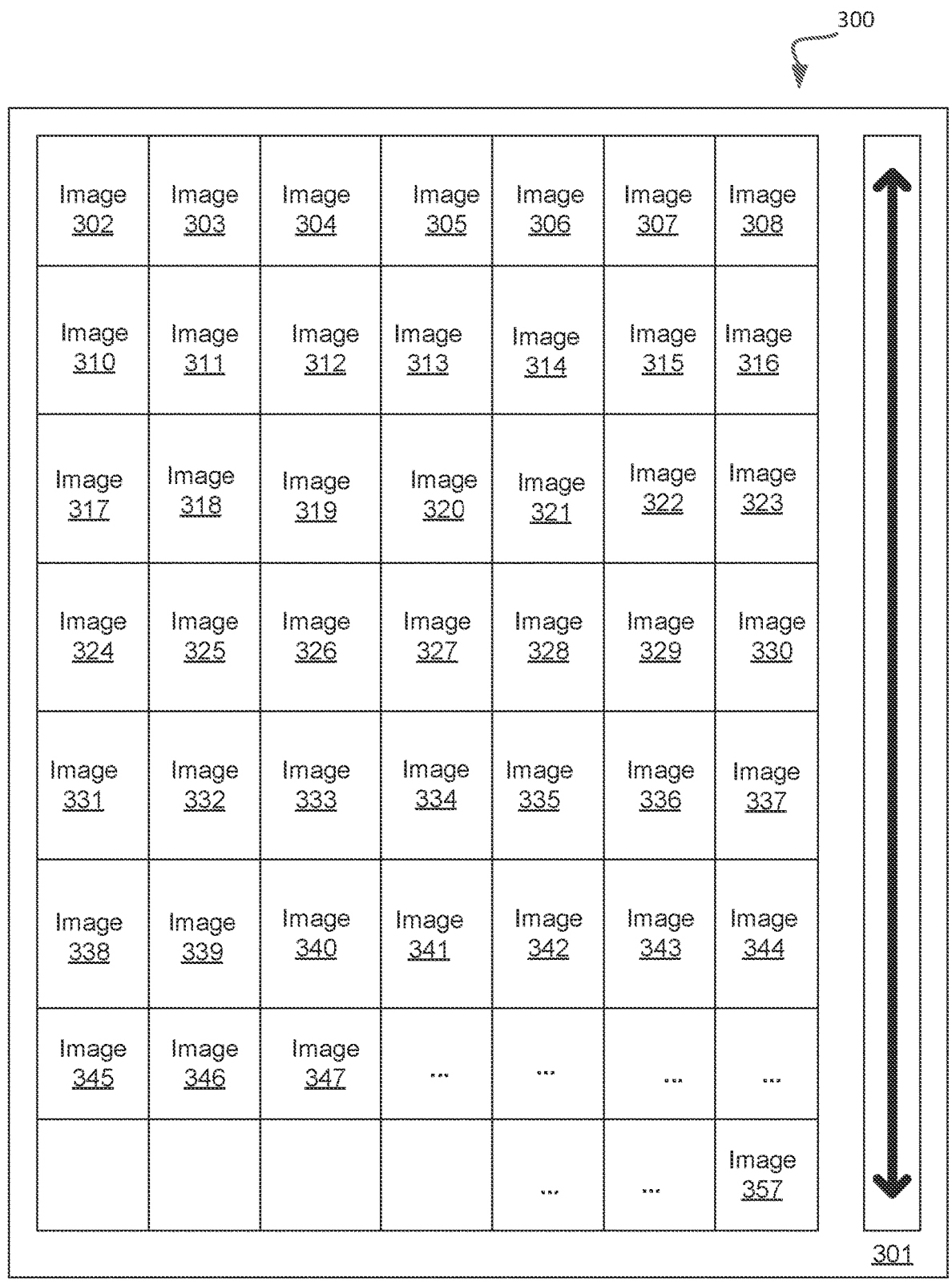
FIG. 3A illustrates an example graphical user interface for the presentation of images to users, in accordance with some implementations of the disclosure.

FIG. 3A illustrates an example graphical user interface for the presentation of images to users, in accordance with some implementations of the disclosure. In some implementations, the graphical user interface 300 can be presented to a user for scanning through a set of images in order to detect particular content (e.g., illicit content). The user may be presented with a set of images on a scrollable grid on the graphical user interface. As illustrated in FIG. 3A, the set of images can include a set of images 302 through 358 arranged according to one or more techniques disclosed herein. A user may also be presented with a scroll bar 301. In some implementations, the user can scroll down using the scroll bar 301 in order to request more images. By scrolling down, the user is presented with more images populated onto the grid and arranged according to one or more techniques disclosed herein. Further details with regard to presenting images to user via the graphical user interface are described in conjunction with FIGS. 4 and 5.

FIG. 3B illustrates an example segmentation of an image, in accordance with some implementations of the disclosure. As described in more details below in conjunction with FIGS. 4 and 5, computing similarity scores and/or concordance values can involve segmenting images of a set of images in order to compute color distances between images. For example, a processing logic (e.g., the image arrangement manager 200 of FIG. 2) can segment one or more images illustrated in FIG. 3A into respective sets of segments. For example, the processing logic can segment image 302 into n×n segments, e.g., n=3. By segmenting image 302 into 3×3 segments, image 302 can have 9 segments, i.e., segment 11 to segment 33. As illustrated in FIG. 3B, segment (11) is the top-left segment, (12) is the top-center segment, (13) is the top-right segment, (22) is the central segment, (33) is the bottom-right segment, and so on. In some implementations, the processing logic can determine the color distance between images based on the respective segments of each image. For example, the processing logic can compute the average color distance between segments in the same position, e.g., between segments (11) in the two images, segments (12) in the two images, and so on. Further details with regard to segmenting images are described in conjunction with FIGS. 4 and 5.

FIG. 4 is a flow diagram of an example method 400 to arrange a set of images for presentation to users. In general, the method 400 may be performed by processing logic that may include hardware (e.g., processing device, circuitry, dedicated logic, programmable logic, microcode, etc.), software (e.g., instructions running on a processing device), or a combination thereof. In some implementations, the method 400 may be performed by the image arrangement manager 200 of FIG. 1 or 2.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

As shown in FIG. 4, the method 400 may begin, at block 410, with the processing logic receiving, via a graphical user interface, a user request for a set of images. In some implementations, the set of images can have an initial order of images, e.g., a random order, a chronological order (based on time of image creation), a subject-based order (based on keywords specified by the creator of various images), or any other suitable order of images. In some implementations, the initial order can be selected based on user input (e.g., a request for a particular category or subject of images). Each image of the set of images can be a thumbnail image of a video. The videos can be uploaded to a content sharing system (e.g., the content sharing system 120 of FIG. 1) by various users. In some implementations, a user (e.g., an expert specializing in detection of particular content) requests the set of images in order to scan/evaluate the set of images for presence of particular content. In some implementations, the particular content can include illicit content as defined under the content sharing system's guidelines/policies. In some implementations, the graphical user interface can be the graphical user interface 300 depicted in FIG. 3A and/or the GUI 111 depicted in FIG. 1. The graphical user interface can display a grid, where the grid includes the set of images. The graphical user interface can further display a scroll bar. The scroll bar can be a vertical or horizontal scroll bar. In some implementations, the user can request the set of images by interacting with the scroll bar, such as scrolling down (or to the right or left of) the grid using the scroll bar and/or clicking on the scroll bar.

At block 415, the processing logic selects a subset of neighboring images. The images in the subset of neighboring images can be ordered according to a first sequence with each neighboring image having a corresponding position in the first sequence. Neighboring images can refer to any cluster of images that is smaller than the full set of images. For example, neighboring images can be a set of one or more images that are adjacent (e.g., next) to each other. In some implementations, the subset of neighboring images can include two images adjacent to each other (nearest neighbor images). For example, as illustrated in FIG. 3A, images 302 and 303 are nearest neighbor images, and images 302 and 310 are also nearest neighbor images, since the respective images are adjacent to each other. In some implementations, FIG. 3A can illustrate the neighboring images ordered in the first sequence. In some implementations, neighboring images can include second nearest neighbors (e.g., images 304 and 306 are second nearest neighbors), etc. In some implementations, a subset of neighboring images can refer to any cluster of images in which any two images can be connected with any number of nearest neighbor links, regardless of the distance between the most distant images. For example, a T-shaped cluster of images (302-306, 312, 319, 326, 333, and 340) has with five images along the top portion of the T-shape (images 302-306) and six images along the middle portion of the T-shape (images 304, 312, 319, 326, 333, and 340) can be a neighboring cluster even though most images in the subset have only one or two nearest neighbors.

At block 420, the processing logic computes a first concordance value. The first concordance value can characterize visual detectability of one or more illicit content features across images in the subset of neighboring images while the set of images are ordered according to the first sequence. In some implementations, computing the first concordance value can include identifying one or more colors of a given image in the subset of neighboring images ordered according to the first sequence. The processing logic can further identify one or more respective colors of another image in the subset of neighboring images, e.g., an image that is a left, a right, a top, or a bottom neighbor of the given image. The processing logic can determine a distance between a color of the one or more identified colors of the given image and a color of the one or more identified colors of the other image.

In some implementations, determining the color distance between the respective colors of the two images can include calculating the color distance using a common color difference algorithm, such as the CIEDE2000 algorithm. For example, in the instance of black-and-white images, the color distance can computed as the difference in the average brightness of pixels of the two images. In the instance of color images, the color distance can be computed as the Euclidean distance in RGB space. More specifically, if $R_1$, $G_1$, and $B_1$ are average red, green, and blue color pixel values of the given image and $R_2$, $G_2$, and $B_2$ are average red, green, and blue color pixel values of the other image, the color distance can be computed as $$\text{Distance} = \sqrt{(R_1-R_2)^2 + (G_1-G_2)^2 + (B_1-B_2)^2}.$$

In some implementations, the color distance can be computed with each specific color difference weighed with a respective (e.g., empirically-defined) weight, $W_R$, $W_G$, and $W_B$:

$$\text{Distance} = \sqrt{W_R \cdot (R_1-R_2)^2 + W_G \cdot (G_1-G_2)^2 + W_B \cdot (B_1-B_2)^2}.$$

The first concordance value can correspond to (e.g., be represented by) the determined distance or can be a function of the determined distance. In some implementations, the first concordance value can also depend on various additional distances, as described below.

In some implementations, computing the first concordance value can include identifying two images in the subset of neighboring images ordered according to the first sequence. The two images can be identified based on adjacency, for example, the processing logic can identify two images that are adjacent to each other in the subset of neighboring images. The processing logic can segment each identified image into respective sets of segments, as illustrated in FIG. 3B. For example, the processing logic can segment each identified image into 3×3 segments. For example, each image can be segmented into n×n segments, e.g., n=3, such that segment (11) is the top-left segment, (12) is the top-center segment, (13) is the top-right segment, (22) is the central segment, (33) is the bottom-right segment, and so on. One or more colors (e.g., average pixel values) can be determine separately for each color. For example, $R_1(13)$ can indicate the average red color of the top-right segment of image 1, $G_2(23)$ can indicate the average green color of the middle-right segment of image 2, and so on. In some implementations, the processing logic can determine the color distance between the first image and the second image by computing the average color distance between segments in the same position, e.g., between segments (11) in the two images, segments (12) in the two images, and so on, such as (weights omitted, for brevity), $$\text{Distance} = \frac{1}{9} \sum_{j=1,2,3} \sum_{k=1,2,3} \sqrt{\frac{[R_1(jk)-R_2(jk)]^2 + [G_1(jk)-}{G_2(jk)]^2 + [B_1(jk)-B_2(jk)]^2}}.$$

In some implementations, the processing logic can determine the color distance between the first image and the second image by computing the average color distance between adjacent segments. For example, if image 1 is positioned to the left of image 2, segment (13) of image 1 is adjacent to segment (11) of image 2, segment (23) of image 1 is adjacent to segment (21) of image 2, and segment (13) of image 1 is adjacent to segment (31) of image 2. The processing logic can determine the color distance between the first image and the second image by computing the average color distance between adjacent segments, such as (weights omitted, for brevity):

$$\text{Distance} = \frac{1}{3} \sum_{j=1,2,3} \sqrt{\frac{[R_1(j3)-R_2(j1)]^2 + [G_1(j3)-}{G_2(j1)]^2 + [B_1(j3)-B_2(j1)]^2}}.$$

In some implementations, each concordance value can characterize geometric patterns in the images in addition to (or instead of) the color differences. For example, image 1 can depict a bridge located in the horizontal plane whereas image 2 can depict walls of a skyscraper positioned in the vertical direction. The processing logic can identify such patterns in the images, e.g., by applying one or more directional filters to each image, A directional filter can identify most likely direction of edges, e.g., by identifying lines of a constant intensity and lines of the largest intensity gradients. In some implementations, identification of such lines can be performed by identifying and minimizing squared error for directions that best match directional patterns of the images. Once it is identified that the direction of edges in image 1 make angle $\theta_1$, e.g., with the horizontal direction, and that the direction of edges in image 1 make angle $\theta_2$, the geometric pattern difference between the two images can be computed as, $$\text{Difference} = \sin^2(\theta_1 - \theta_2),$$

and can have a maximum for perpendicular edges and a minimum for parallel edges. In some embodiments, the geometric pattern difference can be computed separately for each (e.g., 3×3) segment of the images and average over all (e.g., 9) segments. In some implementations, the geometric pattern difference can be computed only for adjacent segments, similarly to how the color difference can be computed. In some implementations, the geometric pattern difference can be computed separately for different colors and then averaged (e.g. using empirically determined weights)

for the whole images. In some implementations, the color distance and the geometric pattern difference can be added to each other (e.g., using empirically-determined weights) to obtain the (first) concordance value. Although, for simplicity and conciseness, the computation of the concordance value has been illustrated above using an example of two adjacent images, the concordance value can similarly be computed for any number of images in a subset of neighboring images, e.g., by first computing a concordance value for each pair of adjacent images in the subset and then computing a total concordance value for the subset (as a sum, an average score, etc.). It should be understood that the above implementations are intended to be illustrative and not exhaustive and that numerous other ways to compute concordance values that characterize visual similarity of two (or more) images can be devised.

In some implementations, computing the first concordance value can include applying a machine learning model to identify geometric pattern differences between images in the subset of neighboring images according to the first sequence. In some implementations, the processing logic can generate training data for the machine learning model. The training data can include a training input. The training input can include pixel data of each image of a set of training images. The set of training images can be provided by a user and/or selected by a content sharing system from the previously uploaded images. The training data can further include a target output for the training input, where the target output identifies the geometric pattern difference between each image of the set of training images. The target output can be provided by one or more users or generated using a previously trained machine learning model. The processing logic can train the machine learning model on the training data, which comprises the training input and the target output as described above. In some implementations, applying the machine learning model to identify geometric pattern differences can include identifying two images in the subset of neighboring images. The two images can be adjacent images in the subset of neighboring images. The processing logic can apply the trained machine learning model to the two images, and obtain an output of the machine learning model, where the output indicates the geometric pattern difference between the two images (e.g., using a value between 0 and 1). The first concordance value can correspond to (e.g., be represented by) the geometric pattern difference.

At block 425, the processing logic computes another, e.g. second, concordance value. The second concordance value can also characterize visual detectability of one or more illicit content features across images in the subset of neighboring images if such images were rearranged according to a second sequence. In some implementations, the second sequence can be a sequence where one or more images are in a position other than their corresponding position in the initial sequence. In some implementations, computing the second concordance value can include identifying one or more colors of an image in the subset of neighboring images if such images were rearranged according to the subsequent sequence. In some implementations, the processing logic can compute the second concordance value using any of the techniques described above in conjunction with the first concordance value, including computing the color differences, geometric pattern differences, and the like.

At block 430, the processing logic can rearrange the subset of neighboring images according to the second sequence. Rearranging the subset of neighboring images according to the second sequence can include converting the corresponding position for one or more images in the first sequence into a new position for the one or more images in the second sequence. For example, as illustrated in FIG. 3A, the positions of images 302 and 303 can be swapped in the subsequent sequence, so that image 303 is to the right of image 302 instead of to the left. In some implementations, the processing logic creates the arrangement of images according to the second sequence in response to a difference between two computed concordance values satisfying a predetermined condition. For example, rearrangement can be responsive to a determination that the second concordance value is higher than the first concordance value. In some implementations, satisfying the predetermined condition can involve determining that the difference between the two computed concordance values is greater than or equal to a threshold value for at least two neighboring images of the subset of neighboring images. In some implementations, the threshold value can be a predefined static value or a value configurable by a user.

At block 435, the processing logic repeats the operations from blocks 415 through block 430 for each newly modified subsequent sequence. In some implementations, the processing logic can repeat the operations for a plurality of additional subsets of neighboring images. The additional subsets can be selected according to a predetermined pattern, e.g., using a sliding window of m×m images moving at each subsequent iteration by s images in the horizontal direction and r images in the vertical direction (e.g., s, r=0, 1, 2, etc.). Additional subsets can be selected until each image of the set of images has been selected at least once as part of selected subsets of neighboring images.

At block 440, the processing logic causes the graphical user interface to be modified to present the set of images to the user. In some implementations, the set of images are presented on a grid according to a modified order resulting from operations of blocks 415-435.

FIG. 5 is a flow diagram of an example method 500 to arrange a set of images for presentation to users. In general, the method 500 may be performed by processing logic that may include hardware (e.g., processing device, circuitry, dedicated logic, programmable logic, microcode, etc.), software (e.g., instructions running on a processing device), or a combination thereof. In some implementations, the method 500 may be performed by the image arrangement manager 200 of FIG. 1 or 2.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

As shown in FIG. 5, the method 500 may begin, at block 510, with the processing logic selecting a subset of images from an ordered set of images. In some implementations, the selected subset of images can be in an initial arrangement (e.g., a random arrangement, a chronological arrangement (based on time of image creation), a subject-based arrangement (based on keywords specified by the creator of various images), or any other suitable arrangement of images. In some implementations, the initial arrangement can be selected based on user input (e.g., a request for a particular category or subject of images). Each image can be a thumbnail image of a video. The videos can be uploaded to a content sharing system (e.g., the content sharing system 120 of FIG. 1) by various users. In some implementations, a user (e.g., an expert specializing in detection of particular content) requests the subset of images in order to scan the subset of images for presence of particular content. In some implementations, the particular content can include illicit content as defined under the content sharing system's guidelines/policies. In some implementations, the user can request the subset of images via a graphical user interface (e.g., the graphical user interface 300 illustrated in FIG. 3A and/or the GUI 111 illustrated in FIG. 1). The graphical user interface can display a grid, where the grid includes the subset of images. The graphical user interface can further display a scroll bar. The scroll bar can be a vertical or horizontal scroll bar. In some implementations, the user can request the subset of images by interacting with the scroll bar, such as scrolling down (or to the right or left of) the grid using the scroll bar and/or clicking on the scroll bar.

In some implementations, the subset of images can include two images adjacent to each other (nearest neighbor images). For example, as illustrated in FIG. 3A, images 302 and 303 are nearest neighbor images, and images 302 and 310 are also nearest neighbor images, since the respective images are adjacent to each other. In some implementations, neighboring images can include second nearest neighbors (e.g., images 304 and 306 are second nearest neighbors), etc. In some implementations, the subset of images can refer to any cluster of images in which any two images can be connected with any number of nearest neighbor links, regardless of the distance between the most distant images. For example, a T-shaped cluster of images (302-306, 312, 319, 326, 333, and 340) has with five images along the top portion of the T-shape (images 302-306) and six images along the middle portion of the T-shape (images 304, 312, 319, 326, 333, and 340) can be a neighboring cluster even though most images in the subset have only one or two nearest neighbors.

At block 515, the processing logic computes a similarity score (e.g., a concordance value). The similarity score can characterize visual similarity of one or more illicit content features across images in the subset of images while the subset of images are in the initial arrangement. In some implementations, the processing logic can compute the similarity score using any of the techniques described above in conjunction with computing concordance values, including computing the color differences, geometric pattern differences, and the like.

At block 520, the processing logic identifies another (e.g., a second) arrangement for the selected subset of images. Identifying another arrangement for the selected subset of images can include identifying a corresponding position for each image in the initial arrangement. The processing logic can then select a new position for each image, so that the other arrangement for the selected subset of images arranges one or more images in a new position (e.g., a position other than their corresponding position in the initial arrangement). For example, as illustrated in FIG. 3A, the positions of images 302 and 303 can be swapped in the second arrangement, so that image 303 is to the right of image 302 instead of to the left.

At block 525, the processing logic computes another, e.g., second, similarity score for the subset of images in the other arrangement. In some implementations, the similarity score can also characterize visual similarity of one or more illicit content features across images in the subset of images in the other arrangement. In some implementations, the processing logic can compute the similarity score using any of the techniques described above in conjunction with computing concordance values, including computing the color differences, geometric pattern differences, and the like.

At block 530, the processing logic determines a probability of accepting the subset of images in the other arrangement. In some implementations, the processing logic determines the probability based on the two computed similarity scores. In some implementations, the processing logic determines the probability further based on a duration for the process of arranging the images. The duration for the process of arranging the images can be based on a number of subsets of images that were previously selected as rearrangement candidates. In some implementations, determining the probability of acceptance is based on a form of simulated annealing, as described herein above. Determining the probability of acceptance of the subset of images in the other arrangement can include first determining that the computed similarity score for the other arrangement is less than the computed similarity score for the initial arrangement. In response to determining that the computed similarity score for the other arrangement is less than the computed similarity score for the initial arrangement, the probability of acceptance of the other arrangement can be a decreasing function of the duration of the image-arrangement process.

For example, the probability function of replacing the initial arrangement with a new arrangement, $P(S_1, S_2, t)$ can be a function of the similarity score of the initial arrangement $S_1$ and the similarity score of the new $S_2$ and of the duration t of the image-arrangement process. The probability function can be such that $P(S_1, S_2, t) \neq 0$ even when $S_1 > S_2$, and can further be such that the probability $P(S_1, S_2, t)$ is a decreasing function of duration t for fixed, $S_1 > S_2$. In other words, the probability of selecting an arrangement with a lower similarity score can be a decreasing function of duration t while the probability of selecting an arrangement with a higher similarity score can be an increasing function of duration t.

At block 535, the processing logic probabilistically selects a new arrangement for the subset of images. In some implementations, the processing logic probabilistically selects the new arrangement based on the determined probability of acceptance. In some implementations, the new arrangement can be probabilistically selected from at least the initial arrangement and the other arrangement for the subset of images.

At block 540, the processing logic causes the selected new arrangement for the subset of images to be displayed via a graphical user interface.

Figure 6:
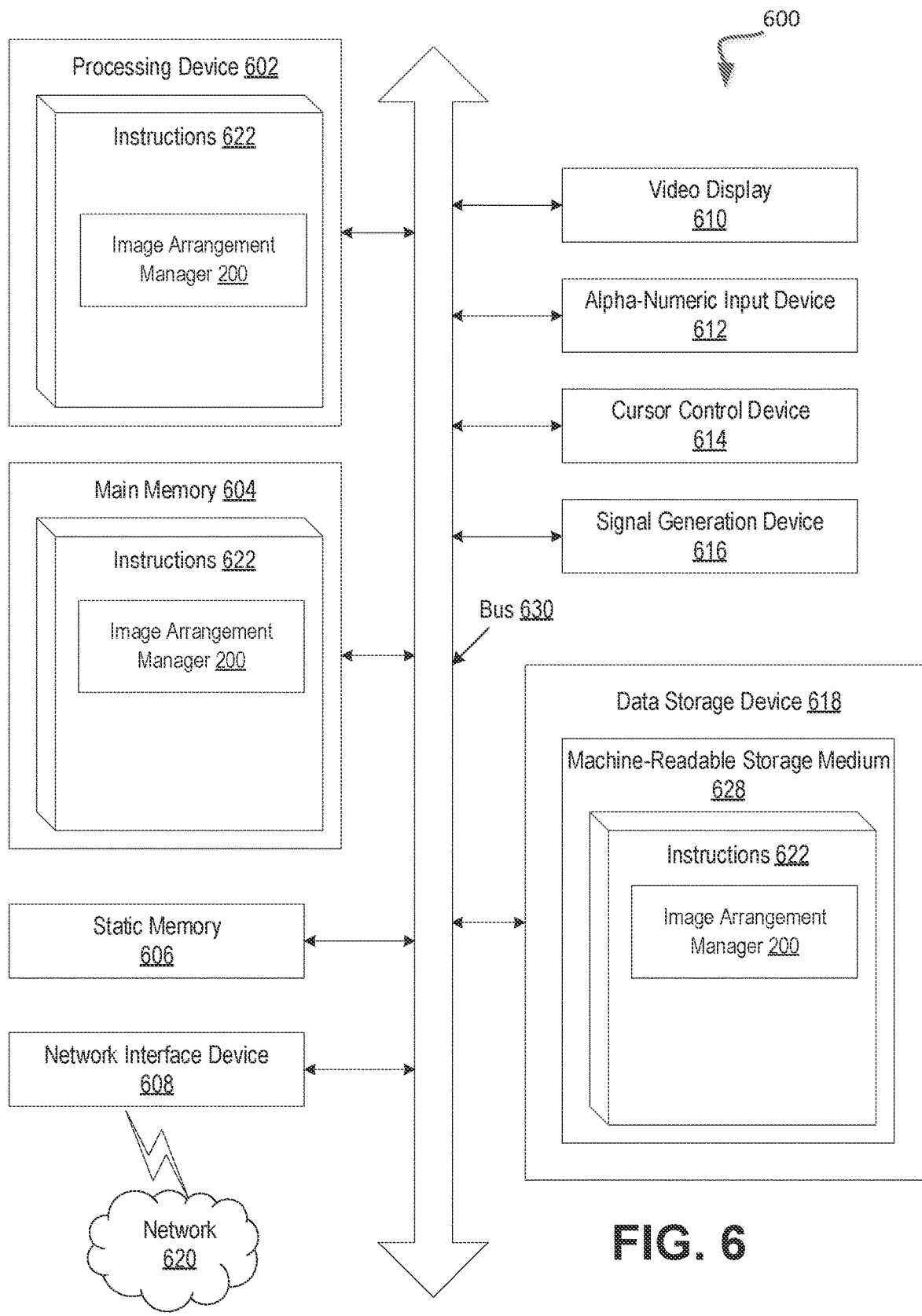
FIG. 6 is a block diagram illustrating an exemplary computer system, in accordance with implementations of the present disclosure.

FIG. 6 is a block diagram illustrating an exemplary computer system 600, in accordance with implementations of the present disclosure. The computer system 600 can correspond to content sharing system 120, server 130, image arrangement manager 200, and/or client devices 110A-Z, described with respect to FIG. 1. Computer system 600 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device (processor) 602, a main memory 604 (e.g., read-only memory (ROM), flash memory, dynamic random access memory (DRAM) such as synchronous DRAM (SDRAM), double data rate (DDR SDRAM), or DRAM (RDRAM), etc.), a static memory 606 (e.g., flash memory, static random access memory (SRAM), etc.), and a data storage device 618, which communicate with each other via a bus 1040.

Processor (processing device) 602 represents one or more general-purpose processing devices such as a microprocessor, central processing unit, or the like. More particularly, the processor 602 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 can also be one or more special-purpose processing devices such as an application specific integrated circuit (ASIC), a field programmable gate array (FPGA), a digital signal processor (DSP), network processor, or the like. The processor 602 is configured to execute instructions 622 (e.g., for predicting channel lineup viewership) for performing the operations discussed herein.

The computer system 600 can further include a network interface device 608. The computer system 600 also can include a video display unit 610 (e.g., a liquid crystal display (LCD) or a cathode ray tube (CRT)), an input device 612 (e.g., a keyboard, and alphanumeric keyboard, a motion sensing input device, touch screen), a cursor control device 614 (e.g., a mouse), and a signal generation device 620 (e.g., a speaker).

The data storage device 618 can include a non-transitory machine-readable storage medium 628 (also computer-readable storage medium) on which is stored one or more sets of instructions 622 (e.g., for integrating a video feed with a shared document during a conference call discussion) embodying any one or more of the methodologies or functions described herein. The instructions can also reside, completely or at least partially, within the main memory 604 and/or within the processor 602 during execution thereof by the computer system 600, the main memory 604 and the processor 602 also constituting machine-readable storage media. The instructions can further be transmitted or received over a network 620 via the network interface device 608.

In one implementation, the instructions 622 include instructions for overlaying an image depicting a conference call participant with a shared document. While the computer-readable storage medium 628 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A computer-implemented method comprising:
receiving, via a graphical user interface, a user request for a set of images, the set of images having an initial order;
(i) selecting a subset of neighboring images, wherein the subset of neighboring images is ordered according to a first sequence;
(ii) computing a first concordance value characterizing visual detectability of one or more illicit content features across images in the subset of neighboring images ordered according to the first sequence;
(iii) computing a second concordance value characterizing visual detectability of one or more illicit content features across images in the subset of neighboring images ordered according to a second sequence;
(iv) responsive to a difference between the second concordance value and the first concordance value satisfying a predetermined condition, rearranging the subset of neighboring images according to the second sequence;
repeating (ii) through (iv) for a plurality of additional subsets of neighboring images until each image of the set of images has been selected at least once as part of selected subsets of neighboring images to obtain a modified order of the set of images; and
causing the graphical user interface to be modified to present the set of images on a grid according to the modified order.

2. The computer-implemented method of claim 1, wherein computing each concordance value characterizing visual detectability of one or more illicit content features across images in the subset of neighboring images comprises:
identifying one or more respective colors of a first image and a second image adjacent to the first image in the subset of neighboring images; and
determining a distance between a first color of the first image and a second color of the second image, wherein each concordance value corresponds to a respective distance.

3. The computer-implemented method of claim 1, wherein computing the first concordance value characterizing visual detectability of one or more illicit content features across images in the subset of neighboring images ordered according to the first sequence comprises:
identifying a first image and a second image adjacent to the first image in the subset of neighboring images ordered according to the first sequence;
segmenting the first image and the second image into respective pluralities of segments, wherein each segment comprises a respective color;
computing a plurality of distance values, wherein each of the plurality of distance values characterizes a distance between the color of a respective segment of the first image and the color of a corresponding segment of the second image; and
determining the first concordance value using the computed plurality of distance values.

4. The computer-implemented method of claim 1, further comprising:
generating training data for a machine learning model, wherein the training data comprises:
a training input comprising pixel data of each image of a plurality of training images; and
generating a target output for the training input, wherein the target output identifies a geometric similarity between each image of the plurality of training images; and
training the machine learning model on the training data comprising the training input and the target output.

5. The computer-implemented method of claim 4, wherein computing each concordance value characterizing visual detectability of one or more illicit content features across images in the subset of neighboring images comprises:
identifying a first image and a second image adjacent to the first image in the subset of neighboring images; and
applying the trained machine learning model to the first image and the second image to obtain an output indicating a geometric similarity between the first image and the second image, wherein each concordance value corresponds to a respective geometric similarity.

6. The computer-implemented method of claim 1, wherein the user request for the set of images is received in response to a user interaction with a scroll-bar comprised by the graphical user interface.

7. The computer-implemented method of claim 1, wherein each image of the set of images comprises a thumbnail image of a video uploaded to a content sharing system by a user.

8. The computer-implemented method of claim 1, wherein rearranging the subset of neighboring images according to the second sequence comprises converting a corresponding position in the first sequence for a neighboring image into a new position in the second sequence.

9. A computer-implemented method to perform an image-arrangement process, the method comprising:
selecting, from an ordered set of images, a subset of images in a first arrangement;
computing a first similarity score characterizing visual similarity of the subset of images in the first arrangement;

identifying a second arrangement for the selected subset of images;

computing a second similarity score characterizing visual similarity of the subset of images in the second arrangement;

determining, based on the first similarity score and the second similarity score, a probability of acceptance of the second arrangement of the subset of images;

probabilistically selecting, based on the determined probability of acceptance, a new arrangement of the subset of images from at least the first arrangement and the second arrangement; and causing to display, via a graphical user interface, the selected new arrangement of the subset of images.

10. The computer-implemented method of claim 9, wherein determining the probability of acceptance is further based on a duration of the image-arrangement process.

11. The computer-implemented method of claim 10, wherein the second similarity score is less than the first similarity score, and wherein the probability of acceptance of the second arrangement is a decreasing function of the duration of the image-arrangement process.

12. The computer-implemented method of claim 10, wherein the duration of the image-arrangement process is defined based on a number of subsets of images previously selected as rearrangement candidates.

13. The computer-implemented method of claim 9, wherein the subset of images comprises a first image and a second image adjacent to the first image.

14. The computer-implemented method of claim 13, wherein the first image is selected randomly from at least a portion of the set of images.

15. The computer-implemented method of claim 13, wherein the first image is selected deterministically according to a predefined selection pattern.

16. The computer-implemented method of claim 9, wherein computing each similarity score characterizing visual similarity of the subset of images comprises:

identifying one or more respective colors of a first image and a second image adjacent to the first image in the subset of images; and determining a distance between a first color of the first image and a second color of the second image, wherein the similarity score corresponds to a respective distance.

17. The computer-implemented method of claim 9, wherein computing the first similarity score characterizing visual similarity of the subset of images comprises:

identifying a first image and a second image adjacent to the first image in the subset of images;

segmenting the first image and the second image into respective pluralities of segments, wherein each segment comprises a respective color;

computing a plurality of distance values, wherein each of the plurality of distance values characterizes a distance between the color of a respective segment of the first image and the color of a corresponding segment of the second image; and determining the first similarity score using the computed plurality of distance values.

18. The computer-implemented method of claim 9, further comprising:

generating training data for a machine learning model, wherein the training data comprises:

a training input comprising pixel data of each image of a plurality of training images; and generating a target output for the training input, wherein the target output identifies a geometric similarity between each image of the plurality of training images; and training the machine learning model on the training data comprising the training input and the target output.

19. The computer-implemented method of claim 18, wherein computing each similarity score characterizing visual similarity of the subset of images comprises:

identifying a first image and a second image adjacent to the first image in the subset of images; and applying the trained machine learning model to the first image and the second image to obtain an output indicating a geometric similarity between the first image and the second image, wherein the similarity score corresponds to a respective geometric similarity.

20. The computer-implemented method of claim 9, wherein each image of the subset of images comprises a thumbnail image of a video uploaded to a content sharing system by a user.

* * * * *